(12) United States Patent
Fukuda

(10) Patent No.: US 8,514,430 B2
(45) Date of Patent: Aug. 20, 2013

(54) APPARATUS, SYSTEM, AND METHOD FOR PROCESSING IMAGE IN NETWORK ENVIRONMENT BASED ON LOCAL PROTOCOL

(75) Inventor: Michitaka Fukuda, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1155 days.

(21) Appl. No.: 12/105,642

(22) Filed: Apr. 18, 2008

(65) Prior Publication Data

US 2008/0259408 A1    Oct. 23, 2008

(30) Foreign Application Priority Data

Apr. 20, 2007   (JP) .................... 2007-111592
Feb. 29, 2008   (JP) .................... 2008-050962

(51) Int. Cl.
*G06F 3/12*  (2006.01)

(52) U.S. Cl.
USPC ......... 358/1.15; 358/442; 358/400; 358/1.14; 358/1.13; 358/1.1

(58) Field of Classification Search
USPC ............... 358/442, 400, 1.15, 1.14, 1.13, 1.1
See application file for complete search history.

(56) References Cited

U.S. PATENT DOCUMENTS

| | | | | |
|---|---|---|---|---|
| 6,256,322 B1* | 7/2001 | Wilson, Jr. | ............ | 370/469 |
| 2002/0134268 A1* | 9/2002 | Yamada | ............ | 101/484 |
| 2003/0074420 A1* | 4/2003 | Hoshino et al. | ............ | 709/218 |
| 2003/0164970 A1* | 9/2003 | Inui et al. | ............ | 358/1.13 |
| 2003/0197892 A1* | 10/2003 | Fukuoh | ............ | 358/1.15 |
| 2006/0026160 A1* | 2/2006 | Duroj | ............ | 707/10 |
| 2006/0224939 A1* | 10/2006 | Namikata | ............ | 715/500 |
| 2006/0271936 A1* | 11/2006 | Matsuda et al. | ............ | 718/102 |

FOREIGN PATENT DOCUMENTS

| | | |
|---|---|---|
| JP | 11-88570 | 3/1999 |
| JP | 2003-196062 | 7/2003 |
| JP | 2003-337681 | 11/2003 |
| JP | 2004-282721 | 10/2004 |
| JP | 2005-108113 | 4/2005 |
| JP | 2005-144970 | 6/2005 |
| JP | 2005-244467 | 9/2005 |

\* cited by examiner

*Primary Examiner* — Benny Q Tieu
*Assistant Examiner* — Martin Mushambo
(74) *Attorney, Agent, or Firm* — Oblon, Spivak, McClelland, Maier & Neustadt, L.L.P.

(57) ABSTRACT

An image processing system includes a first image processing apparatus and a second image processing apparatus that are connected via a network in which communication is performed based on a local protocol. The cooperative processing is performed between the first and second image forming apparatuses via the network.

9 Claims, 12 Drawing Sheets

APPARATUS, SYSTEM, AND METHOD FOR PROCESSING IMAGE IN NETWORK ENVIRONMENT BASED ON LOCAL PROTOCOL

CROSS-REFERENCE TO RELATED APPLICATIONS

The present application claims priority to and incorporates by reference the entire contents of Japanese priority documents, 2007-111592 filed in Japan on Apr. 20, 2007 and 2008-050962 filed in Japan on Feb. 29, 2008.

BACKGROUND OF THE INVENTION

1. Field of the Invention

The present invention relates to an apparatus, a system, and a method for processing an image.

2. Description of the Related Art

Cooperative processing in which a plurality of image forming apparatuses connected with each other performs processing in cooperation with each other is known as one type of image forming processing. For example, a first image processing apparatus and a second image processing apparatus are connected via a single communication path (i.e., a network) and cooperative processing is performed via the communication path. Alternatively, the first and second image processing apparatuses are connected via two communication paths (i.e., a network and an IEEE1394 bus), and the cooperative processing is performed via one of the communication paths.

For example, an image forming system is disclosed in Japanese Patent Application Laid-open No. 2005-108113, in which two communication paths are used to connect two image processing apparatuses. In this system, a plurality of pieces of image data (jobs) is transferred between the apparatuses in parallel via the communication paths, and which communication path is to be used is decided based on the type of image data. This system reduces the time required for transferring image data and the load on the apparatus that sends the image data. Specifically, in this system, a first image processing apparatus and a second image processing apparatus are connected via two communication paths, i.e., a network and a video interface, and the network and the video interface are selectively used when performing cooperative processing.

There has been a need to increase the productivity in performing cooperative processing, i.e., to increase the communication speed. There has been also a need to connect a plurality of image processing apparatuses with an interface configured to achieve longer communication distance.

The method in which two image processing apparatuses are connected via a single path (i.e., a network) is advantageous in that an interface that achieves longer communication distance can be used to connect the two image processing apparatuses. However, because the two image processing apparatuses share the network, it is difficult to ensure a predetermined level of productivity, and it is also difficult to increase the communication speed because the overhead increases due to a process performed based on the TCP/IP.

If two image processing apparatuses are connected via two communication paths (for example, a network and an IEEE1394 bus) and cooperative processing is performed via one of the communication paths, a dedicated bus (for example, an IEEE1394 bus) is used, so that the communication speed can increase. However, a communication distance via the dedicated bus is limited compared to that via the network.

Although the image forming system disclosed in Japanese Patent Application Laid-open No. 2005-108113 ensures a predetermined level of productivity (communication speed), the communication distance is limited. In addition, the design of the image forming system becomes complicated because the interfaces must be made selectable.

SUMMARY OF THE INVENTION

It is an object of the present invention to at least partially solve the problems in the conventional technology.

According to an aspect of the present invention, there is provided an image processing apparatus including a first network interface connectable to a first network in which communication is performed based on a general protocol; and a second network interface connectable to a second network in which communication is performed based on a local protocol between the image forming apparatus and an external apparatus connectable to the second network.

According to another aspect of the present invention, there is provided an image processing system including a first image processing apparatus; and a second image processing apparatus, wherein the first image processing apparatus includes a first network interface connectable to a first network in which communication is performed based on a general protocol; a second network interface connectable to a second network in which communication is performed based on a local protocol between the first image forming apparatus and the second image processing apparatus connectable to the second network; and a first control unit that communicates with the second image processing apparatus via the second network interface to perform cooperative image processing in cooperation with the second image processing apparatus, and the second image processing apparatus includes a third network interface connectable to the second network to be connected to the first image processing apparatus; and a second control unit that communicates with the first image processing apparatus via the third network interface to perform the cooperative image processing in cooperation with the first image processing apparatus.

According to still another aspect of the present invention, there is provided an image processing method performed by an image processing system including a first image processing apparatus and a second image processing apparatus, the first image processing apparatus including a first network interface connectable to a first network in which communication is performed based on a general protocol; and a second network interface connectable to a second network in which communication is performed based on a local protocol between the first image forming apparatus and the second image processing apparatus connectable to the second network, and the second image processing apparatus including a third network interface connectable to the second network to be connected to the first image processing apparatus, the image processing method including: causing the first image processing apparatus to communicate with the second image processing apparatus based on the local protocol to perform cooperative image processing in cooperation with the second image processing apparatus; and causing the second image processing apparatus to communicate with the first image processing apparatus via the third network interface to perform the cooperative image processing in cooperation with the first image processing apparatus.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
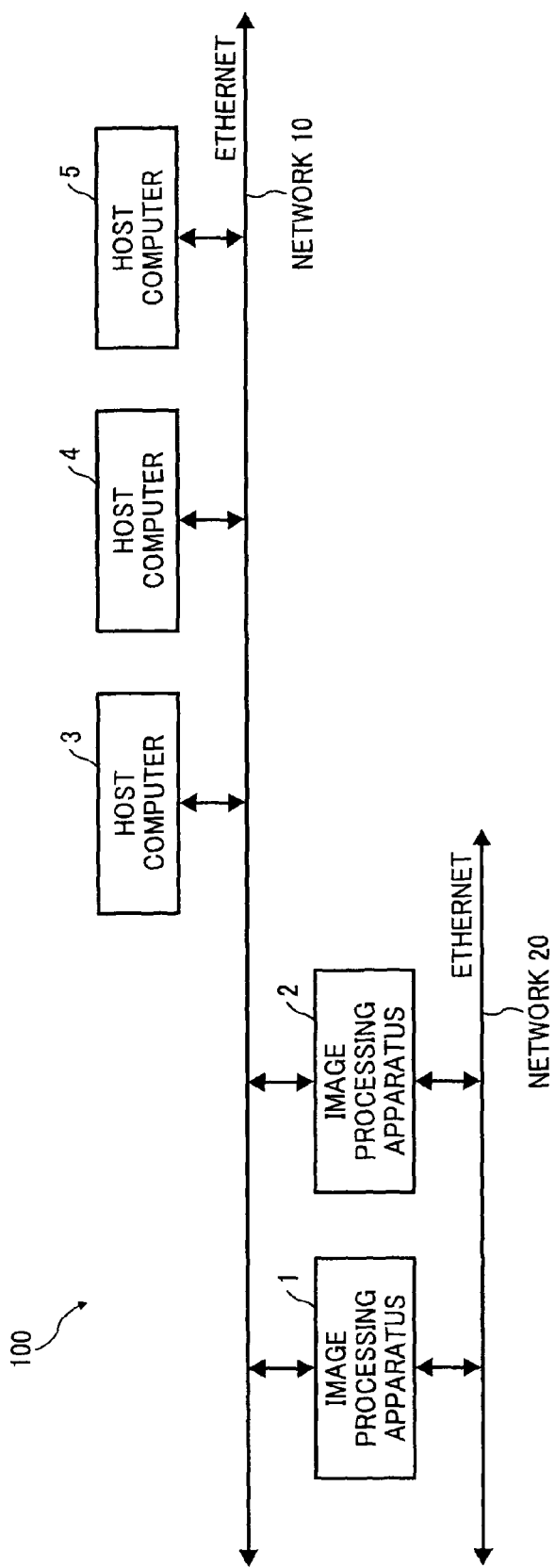
FIG. 1 is a block diagram of an image processing system according to an embodiment of the present invention.

FIG. 1 is a block diagram of an image processing system 100 according to an embodiment of the present invention. The image processing system 100 includes image processing apparatuses 1 and 2 each including network interfaces (local area network interfaces) (not shown). The image processing apparatuses 1 and 2 are connectable via the network interfaces to networks 10 and 20 that are independent from each other.

Host computers 3, 4, and 5, each of which, for example, issues a printing request, are also connected to the network 10. In the network 10, communication is performed based on a general protocol such as the TCP/IP.

In the network 20, communication is performed based on a local protocol that is a communication protocol defined beforehand between the image processing apparatuses 1 and 2.

The image processing apparatuses 1 and 2 include a single mode and a cooperative mode. In the single mode, image processing such as copying or printing is performed only by, for example, the image processing apparatus 1. In the cooperative mode, the image processing apparatuses 1 and 2 serve as a pair of an upper-level device and a lower-level device and perform cooperative processing. In the embodiment, the image processing apparatus 1 serves as an upper-level apparatus and the image processing apparatus 2 serves as a lower-level apparatus. However, the system configuration is not limited to this.

The cooperative processing is image processing such as cooperative copy processing or cooperative print processing performed by a plurality of image forming apparatuses in cooperation. In the cooperative copy processing, the image processing apparatus 1 (upper-level apparatus) scans an original (image), obtains image data, and prints the image data. Thereafter, the image processing apparatus 1 sends the image data to the image processing apparatus 2 (lower-level apparatus), and the image processing apparatus 2 prints the image data. In the cooperative print processing, the image processing apparatus 1 prints image data received from, for example, the host computer 3. Thereafter, the image processing apparatus 1 sends the image data to the image processing apparatus 2, and the image processing apparatus 2 prints the image data.

Figure 2:
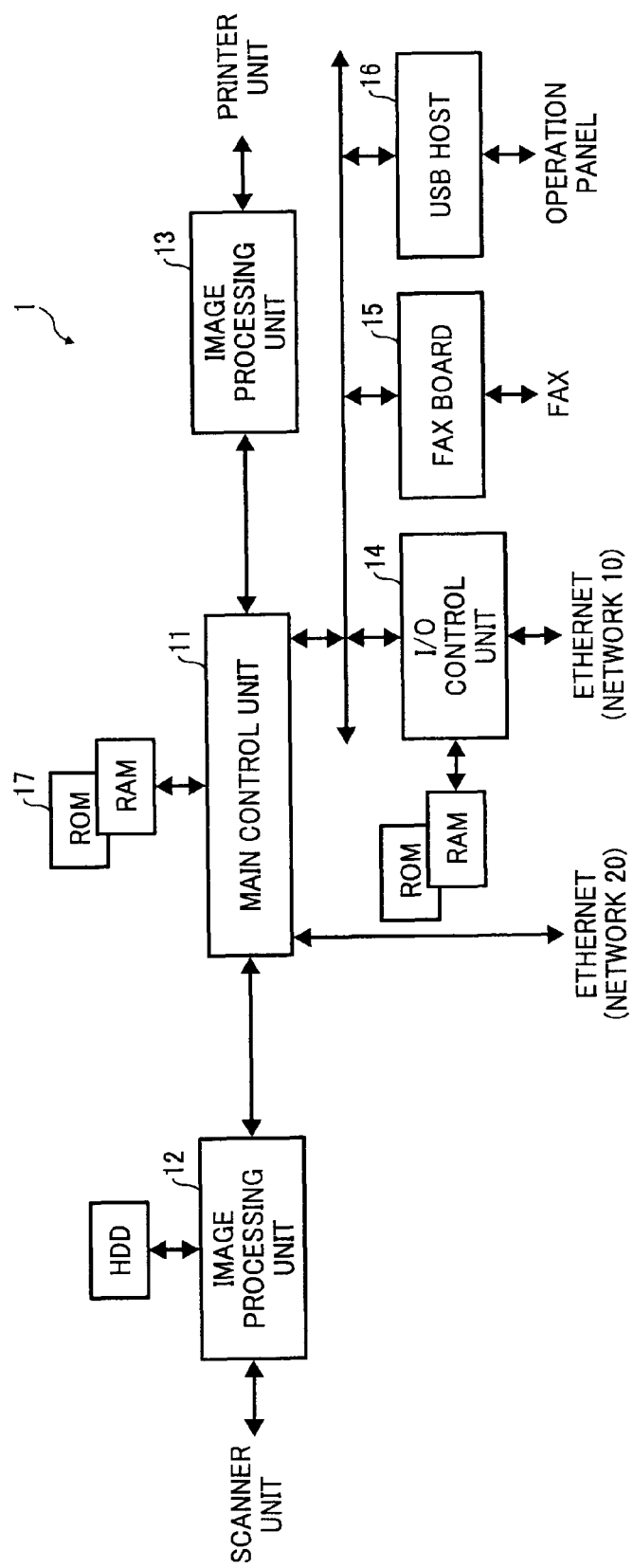
FIG. 2 is a block diagram of an upper-level image processing apparatus shown in FIG. 1.

The image processing apparatus 1 is a multifunction printer having functions of a copier, a printer, a facsimile (FAX) machine, a scanner, and the like. FIG. 2 is a block diagram of the image processing apparatus 1.

The image processing apparatus 1 includes a main control unit 11, image processing units 12 and 13, an input/output (I/O) control unit 14, a FAX board 15, a universal serial bus (USB) host 16, a storage unit 17 including a read only memory (ROM) and a random access memory (RAM), a printer unit, and a scanner unit.

The scanner unit is an engine that scans an original and obtains image data, and the printer unit prints image data.

The main control unit 11 includes a central processing unit (CPU) (not shown), a memory controller (not shown), an interface (not shown) connectable to each chip, and a network interface. The main control unit 11 is a system-on-a-chip (SOC) that is an integrated circuit (IC) in which a plurality of functions is integrated on a single semiconductor chip. The main control unit 11 generates a data frame, in which a command to be executed by the image processing apparatus 2 and a setting condition of the command are set, based on the local protocol.

The cooperative mode can be selected by a user via an operation panel of the image processing apparatus 1 when, for example, performing initial setting. Upon selecting the cooperative mode, information that a current mode is the cooperative mode is stored in the storage unit 17. When the image processing such as copy processing or print processing is started, the main control unit 11 accesses the storage unit 17 to determine the current mode. When the current mode is the cooperative mode, the main control unit 11 generates a data frame after the image processing, and sends the data frame to the image processing apparatus 2 via the network 20.

The image processing unit 12 processes the image data transferred from the scanner unit, and the image processing unit 13 processes the image data to be sent to the printer unit. The image processing units 12 and 13 are each an application specified IC (ASIC) having the image processing function explained above.

The I/O control unit 14 is an SOC and includes an external interface such as a network interface. The FAX board 15 includes a FAX interface. The USB host 16 is connectable to an operation panel of a multifunction printer or a single function printer.

Each of the image processing apparatuses 1 and 2 includes the network interfaces. One of the network interfaces is connected to the network 10 in which the host computers 3, 4, and 5 and the image processing apparatuses 1 and 2 are connected and communication is performed based on the general protocol. The other network interface is connected to the network 20 in which the image processing apparatuses 1 and 2 are connected and communication is performed based on the local protocol. Specifically, the I/O control unit 14 includes the network interface connectable to the network 10, and the main control unit 11 includes the network interface connectable to the network 20.

A local protocol is different from a general protocol such as the TCP/IP and is defined only between predetermined apparatuses (in this case, the image processing apparatuses 1 and 2) for performing cooperative processing. Any communication protocol can be employed as long as it allows the image processing apparatuses to communicate with each other and perform the cooperative processing therebetween.

Figure 3:
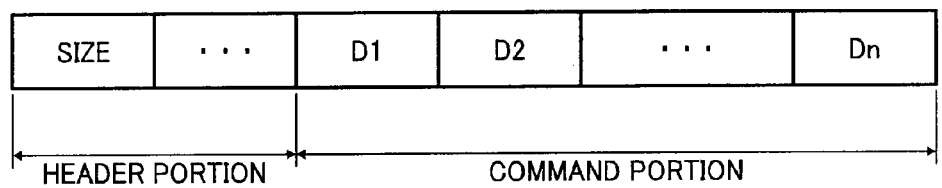
FIG. 3 is a schematic diagram of a data structure of a data frame based on a local protocol.

According to the local protocol of the embodiment, a data frame sent from the image processing apparatus 1 to the image processing apparatus 2 has a data structure in which a command to be executed by an apparatus that receives the data frame can be set. FIG. 3 is a schematic diagram of the data structure of the data frame based on the local protocol.

The data frame generated based on the local protocol has a header portion and a command portion. In the command portion, one or a plurality of commands are each associated with a setting condition corresponding thereto and are set as "D1", "D2", . . . "Dn" (n is an integer larger than 1). When a printing command or a storing command is set, image data to be printed or to be stored is also set in the data frame. In addition, a size of each command is set in the header portion.

Specifically, in the cooperative processing, the main control unit 11 generates a data frame in which a command to be executed by the image processing apparatus 2 and a size of the command are set.

Upon receiving the data frame from the image processing apparatus 1, a main control unit 21 of the image processing apparatus 2 analyzes the data frame, extracts the command issued by the image processing apparatus 1 from the data frame, and executes the command. In this manner, the cooperative processing between the image processing apparatuses 1 and 2 is performed in accordance with the command set by the image processing apparatus 1.

A command and a setting condition thereof are, for example, an initialization command for shifting a lower-level apparatus to the cooperative mode, a printing command and a printing condition for causing a lower-level apparatus to print image data, or a storing command and a storing condition for causing a lower-level apparatus to store predetermined image data.

If an upper-level apparatus and a lower-level apparatus perform cooperative processing based on a general protocol such as the TCP/IP, communication needs to be performed in accordance with a communication procedure defined in the general protocol (e.g., for each layer in the open system interconnection (OSI) reference model), so that the image processing apparatuses need to communicate with each other a plurality of times for performing one cooperative processing. This results in increasing overhead in the cooperative processing.

According to the embodiment, the upper-level apparatus and the lower-level apparatus communicate with each other based on the general protocol that defines a structure of a data frame as explained above. Therefore, the image processing apparatus 1 generates a data frame in which an initialization command is set and sends the data frame to the image processing apparatus 2. In addition, the image processing apparatus 1 generates a data frame in which a printing command is set and sends the data frame to the image processing apparatus 2. The image processing apparatus 2 shifts to the cooperative mode by the initialization command set in the data frame, and then, executes the printing command set in the next data frame. In other words, by communicating with each other only twice, the image processing apparatuses 1 and 2 can perform the cooperative processing, which reduces overhead in the cooperative processing.

Figure 4:
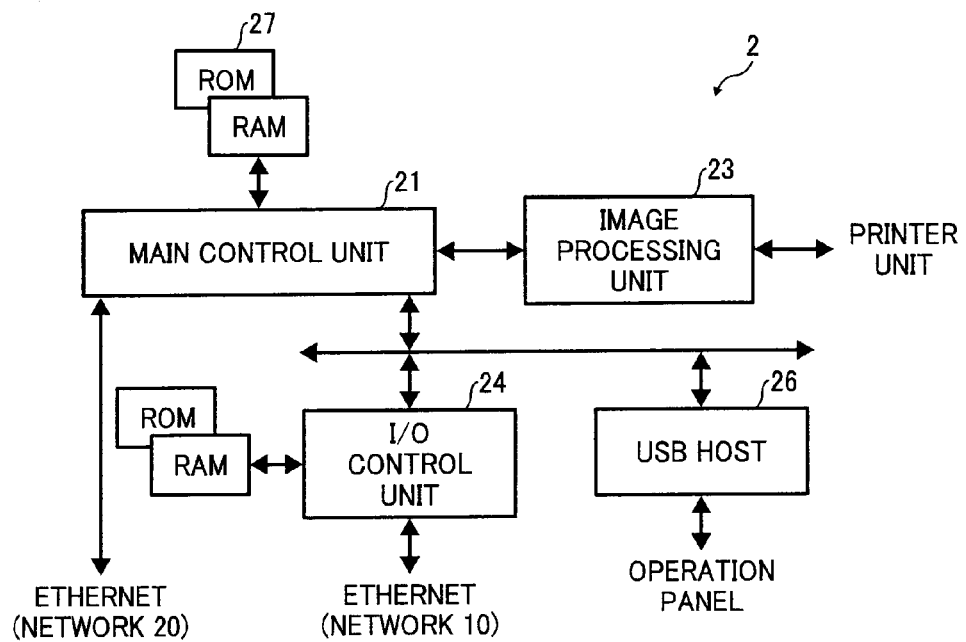
FIG. 4 is a block diagram of a lower-level image processing apparatus shown in FIG. 1.

The image processing apparatus 2 is a single-function printer. FIG. 4 is a block diagram of the image processing apparatus 2.

The image processing apparatus 2 includes the main control unit 21, an image processing unit 23, an I/O control unit 24, an USB host 26, a storage unit 27 including a ROM and a RAM, and a printer unit. The printer unit is an engine that prints image data.

The main control unit 21 is an SOC, and includes a CPU (not shown), a memory controller (not shown), an interface (not shown) connectable to each chip, and a network interface connectable to the network 20. The main control unit 21 receives a data frame from the image processing apparatus 1 via the network 20, analyzes the data frame, and extracts the command and the setting condition from the data frame. The main control unit 21 executes the command in accordance with the setting condition.

If the data frame from the image processing apparatus 1 contains the initialization command, the main control unit 21 sets the current mode to the cooperative mode by storing in the storage unit 27 information that the current mode is the cooperative mode.

The image processing unit 23 is an ASIC having the image processing function, and processes image data to be output to the printer unit.

The I/O control unit 24 is an SOC and includes an external interface such as a network interface.

The USB host 26 is connectable to an operation panel of a multifunction printer or a single-function printer.

Figure 5:
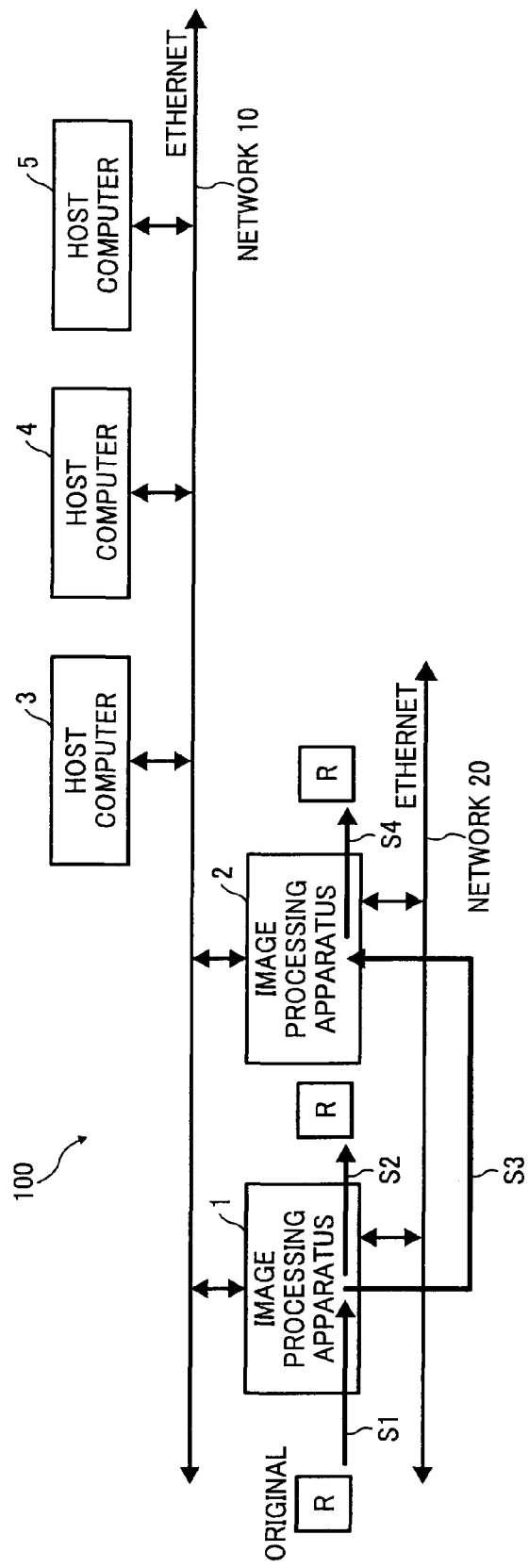
FIG. 5 is a block diagram illustrating a data flow in the image processing system in cooperative copy processing.

The cooperative copy processing performed by the image processing apparatuses 1 and 2 is explained below as an example of the cooperative processing. The user issues a cooperative copying request via the image processing apparatus 1, and the image processing apparatuses 1 and 2 perform the cooperative copy processing based on the cooperative copying request. FIG. 5 is a block diagram illustrating a data flow in the image processing system 100 in the cooperative copy processing.

The image processing apparatus 1 scans an original, obtains image data, and processes the image data (Step S1). After printing the image data processed at Step S1 (Step S2), the image processing apparatus 1 generates a data frame in which a printing command to be executed by the image processing apparatus 2 and a printing condition are set, and sends the data frame to the image processing apparatus 2 assigned with a predetermined address based on the local protocol (Step S3). The image processing apparatus 2 prints the image data based on the printing command and the printing condition set in the data frame (Step S4).

The cooperative copy processing is explained in detail below with reference to FIGS. 6 and 7.

Figure 6:
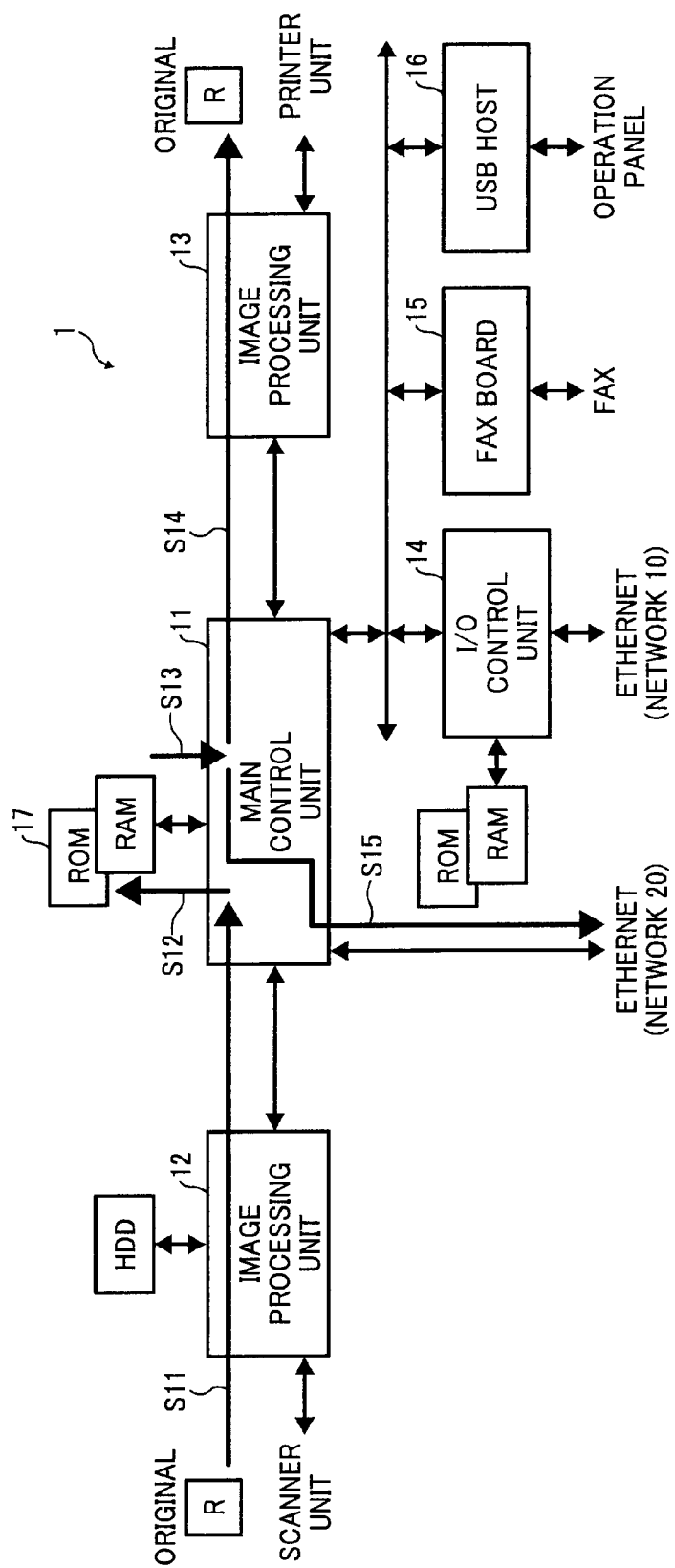
FIG. 6 is a block diagram illustrating a data flow in the upper-level image processing apparatus in the cooperative copy processing.
Figure 7:
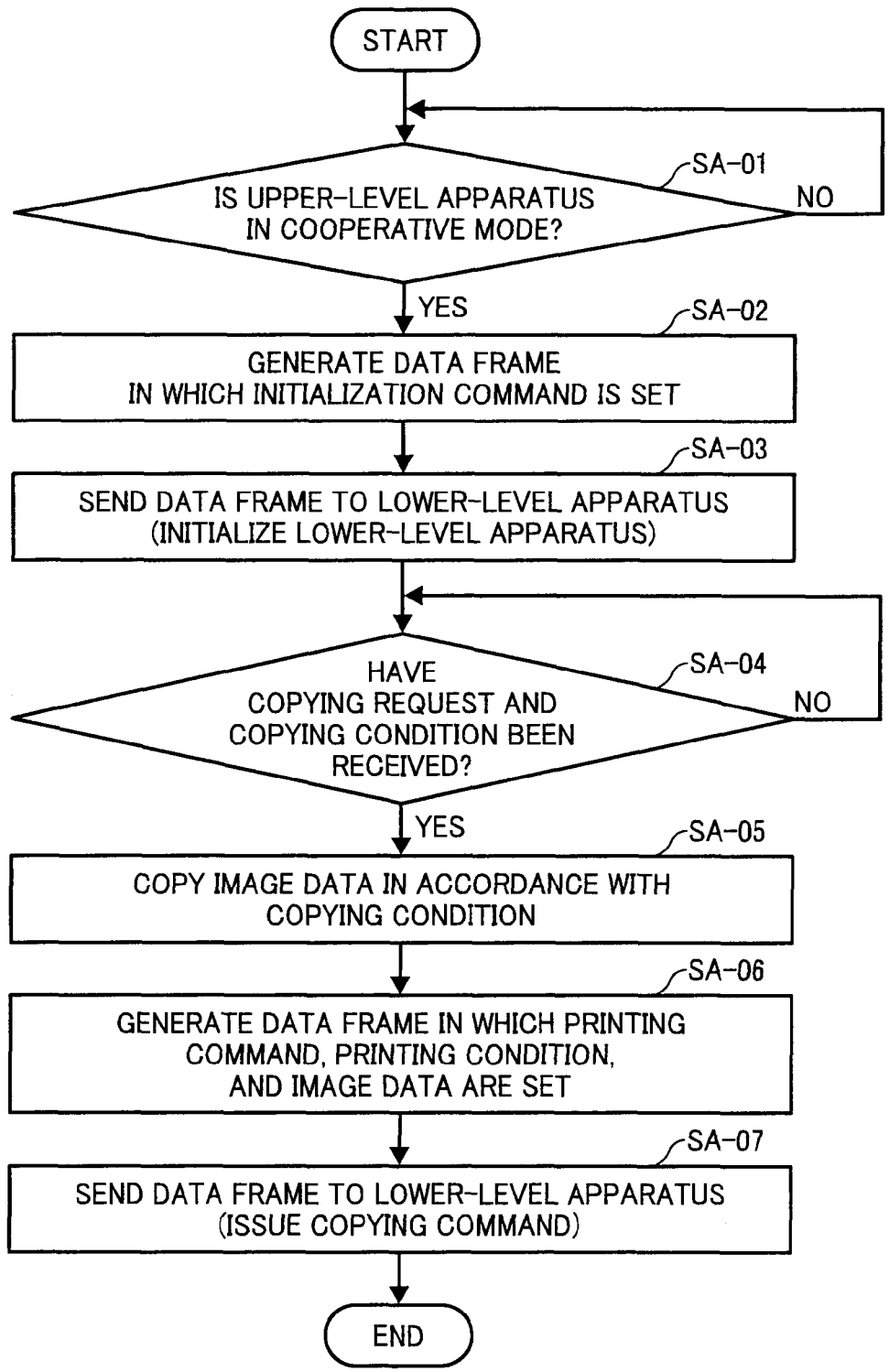
FIG. 7 is a flowchart of a process performed by the upper-level image processing apparatus during the cooperative copy processing.

FIG. 6 is a block diagram illustrating a data flow in the image processing apparatus 1 in the cooperative copy processing. FIG. 7 is a flowchart of a process performed by the image processing apparatus 1 during the cooperative copy processing.

The main control unit 11 accesses the storage unit 17 and determines whether the image processing apparatus 1 is in the cooperative mode (Step SA-01). When the image processing apparatus 1 is in the cooperative mode (YES at Step SA-01), the main control unit 11 generates a data frame in which an initialization command is set (Step SA-02). The main control unit 11 sends the data frame to the image processing apparatus 2 via the network 20, thereby initializing the image processing apparatus 2 (Step SA-03). The operation at Step SA-03 is performed to determine whether the image processing apparatus 2 can communicate (i.e., for example, the image processing apparatus is ON) and to shift the image processing apparatus 2 to the cooperative mode.

The main control unit 11 enters a copying-request waiting state of waiting for a copying request and a copying condition (for example, the number of copies, a sheet output size, an image quality mode such as a text mode, a photographic mode, or a text and photographic mode, and a printing mode such as a single-sided printing or a double-sided printing) that are issued by the user via the operation panel (for example, by pressing a copying button). The main control unit 11 determines whether a printing request and a printing condition have been received (Step SA-04). When a copying request and a copying condition have been received (YES at Step SA-04), the main control unit 11 causes the image setting unit 13 to process image data in accordance with the copying condition and causes the printer unit to copy the image data (Step SA-05).

Specifically, the image processing apparatus 1 scans an original and obtains image data (Step S11). The image processing unit 23 processes the image data and the processed image data is stored in the storage unit 17 (Step S12).

After the image data is read from the storage unit 17 (Step S13), the image processing unit 13 processes the image data and sends the processed image data to the printer unit and the printer unit prints the image data (Step S14).

After the printer unit prints the image data, the main control unit 11 generates a data frame in which a printing command, a printing condition, and the image data are set (Step SA-06), and sends the data frame to the image processing apparatus 2 (Step SA-07 and Step S15). In the flowchart shown in FIG. 7, only one job (request) is executed (i.e., a data frame containing one printing command is sent to the image processing apparatus 2) and the process is completed. However, a plurality of jobs (requests) can be executed in a way that the process control goes back to Step SA-01 after step SA-07 and the main control unit 11 enters the copying-request waiting state again.

Figure 8:
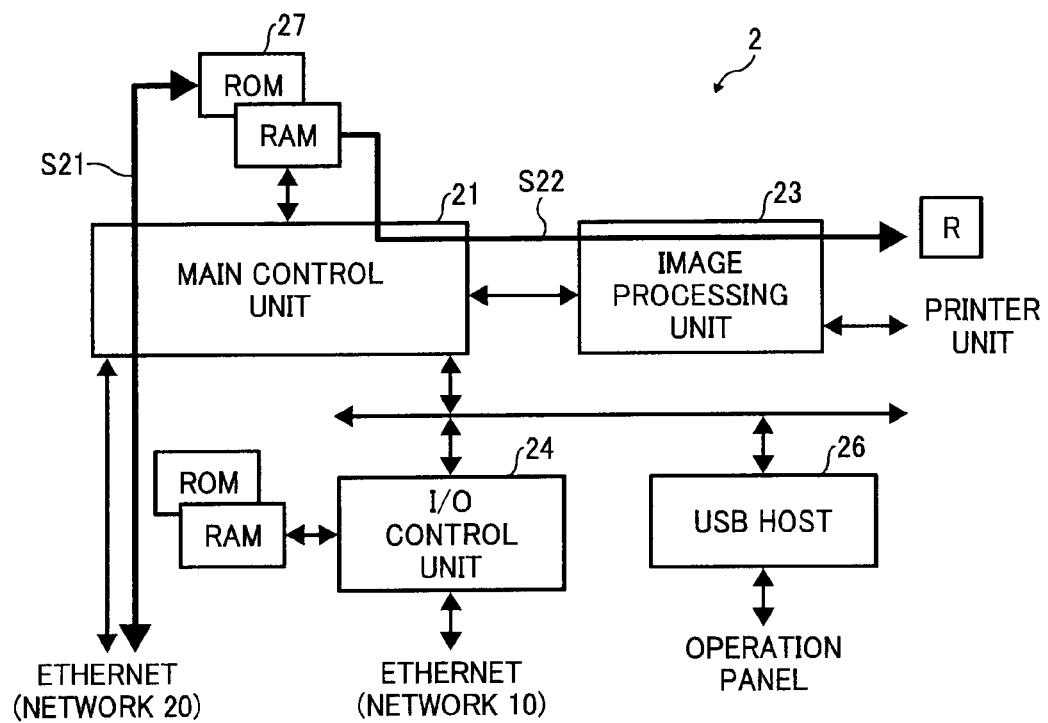
FIG. 8 is a block diagram illustrating a data flow in the lower-level image processing apparatus in the cooperative copy processing.
Figure 9:
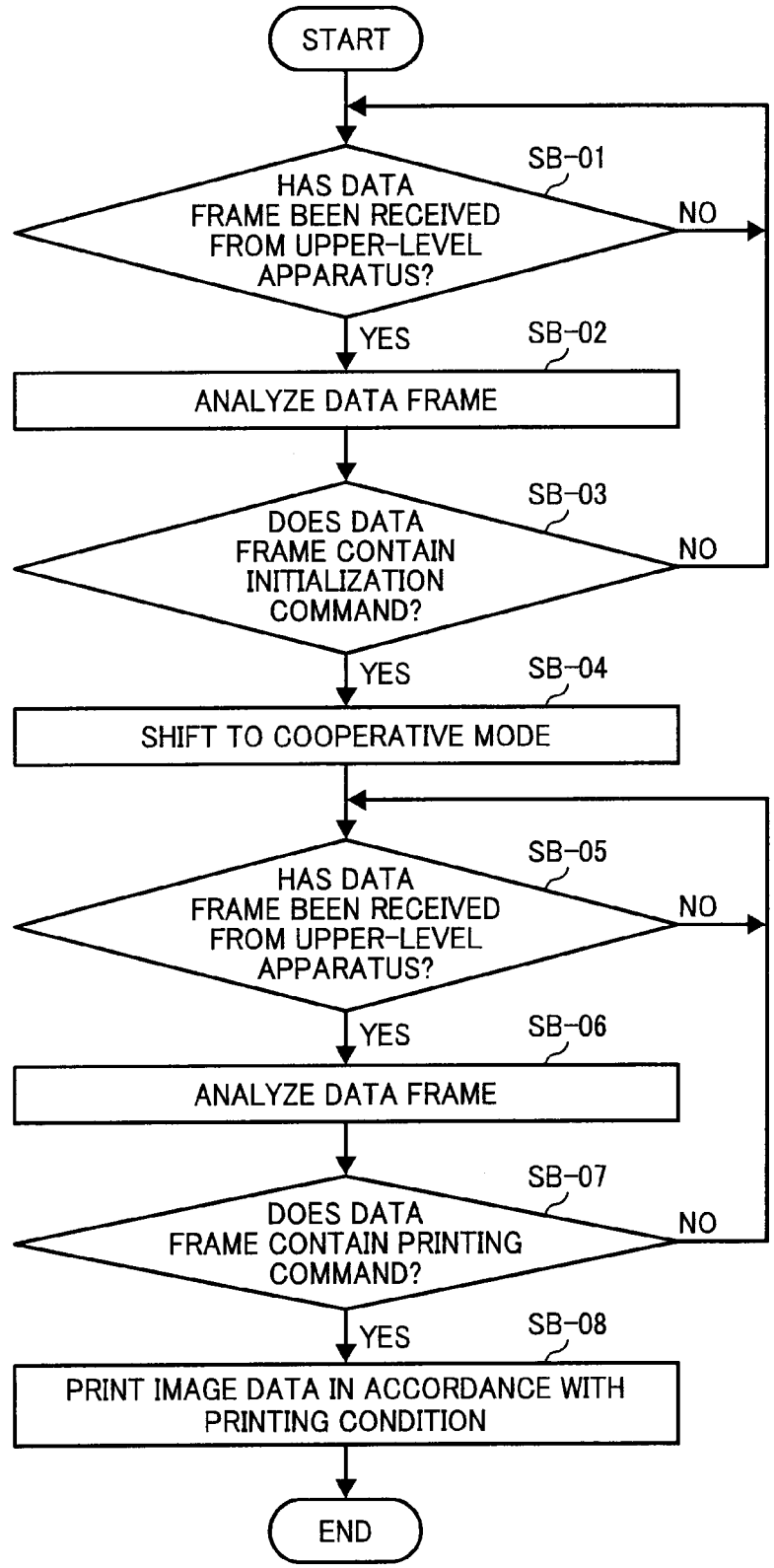
FIG. 9 is a flowchart of a process performed by the lower-level image processing apparatus during the cooperative copy processing.

How the cooperative copy processing is performed by the image processing apparatus 2 is explained below with reference to FIGS. 8 and 9. FIG. 8 is a block diagram illustrating a data flow in the image processing apparatus 2 in the cooperative copying process. FIG. 9 is a flowchart of a process performed by the image processing apparatus 2 during the cooperative copy processing.

The main control unit 21 in a data-frame waiting state of waiting for a data frame from the image processing apparatus 1 determines whether the image processing apparatus 2 has received a data frame from the image processing apparatus 1 (Step SB-01). When a data frame has been received from the image processing apparatus 1 (YES at Step SB-01), the main control unit 21 analyzes the data frame (Step SB-02) and determines whether the data frame contains an initialization command (Step SB-03). When the data frame does not contain an initialization command (NO at Step SB-03), the main control unit 21 enters the data-frame waiting state again.

When the data frame contains an initialization command (YES at Step SB-03), the main control unit 21 shifts to the cooperative mode and enters the data-frame waiting state (Step SB-04). At Step SB-04, the main control unit 21 is ready to accept a printing command only. The main control unit 21 determines whether a data frame has been received (Step SB05).

When a data frame has been received (YES at Step SB05), the main control unit 21 analyzes the data frame (Step SB-06) and determines whether the data frame contains a printing command (Step SB-07). When the data frame does not contain a printing command (NO at Step SB-07), the main control unit 21 enters the data-frame waiting state again.

When the data frame contains a printing command (YES at step SB-07), the main control unit 21 extracts the image data and the printing condition (for example, the number of copies, a sheet output size, an image quality mode such as a text mode, a photographic mode, or a text and photographic mode, and a printing mode such as a single-sided printing or a double-sided printing) from the data frame. Thereafter, the main control unit 21 causes the image processing unit 23 to process the image data in accordance with the printing condition and causes the printing unit to print the image data processed by the image processing unit 23 (Step SB-08).

Specifically, the main control unit 21 stores in the storage unit 27 the image data contained in the data frame from the image processing apparatus 1 (Step S21). The main control unit 21 reads the image data from the storage unit 27, causes the image processing unit 23 to process the image data, and causes the printer unit to print the image data processed by the image processing unit 23 (Step S22).

The image processing system 100 performs the cooperative copy processing in a manner explained above with reference to FIGS. 6 to 9.

Cooperative print processing performed by the image processing system 100 is explained below with reference to FIGS. 10 to 13. In the cooperative print processing, a printing request is issued by a host computer and the image processing apparatuses 1 and 2 perform the cooperative print processing by the cooperative printing request.

Figure 10:
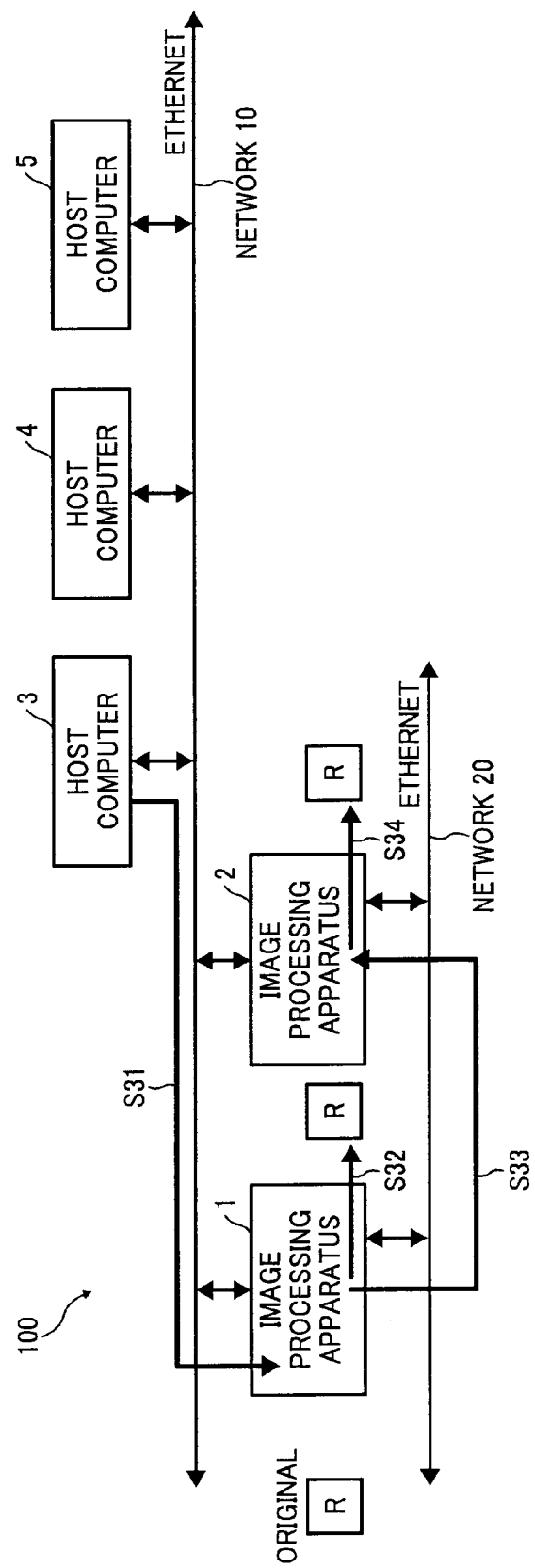
FIG. 10 is a block diagram illustrating a data flow in the image processing system in the cooperative print processing.

FIG. 10 is a block diagram illustrating a data flow in the image processing system 100 in the cooperative print processing is performed. The host computer 3 issues a printing request for printing an original to the image processing apparatus 1 (Step S31). The image processing apparatus 1 performs drawing processing of the image data and prints the image data (Step S32). The image processing apparatus 1 generates a data frame in which a printing command, a printing condition, and the image data are set, and sends the data frame to the image processing apparatus 2 based on the local protocol (Step S33). The image processing apparatus 2 receives the data frame and prints the image data based on the print command and the printing condition set in the data frame (Step S34).

The data flow shown in FIG. 10 is usually achieved between multifunction printers, a multifunction printer and a single-function printer, or single function printers.

How the cooperative print processing is performed by the image processing apparatuses 1 and 2 is explained below.

Figure 11:
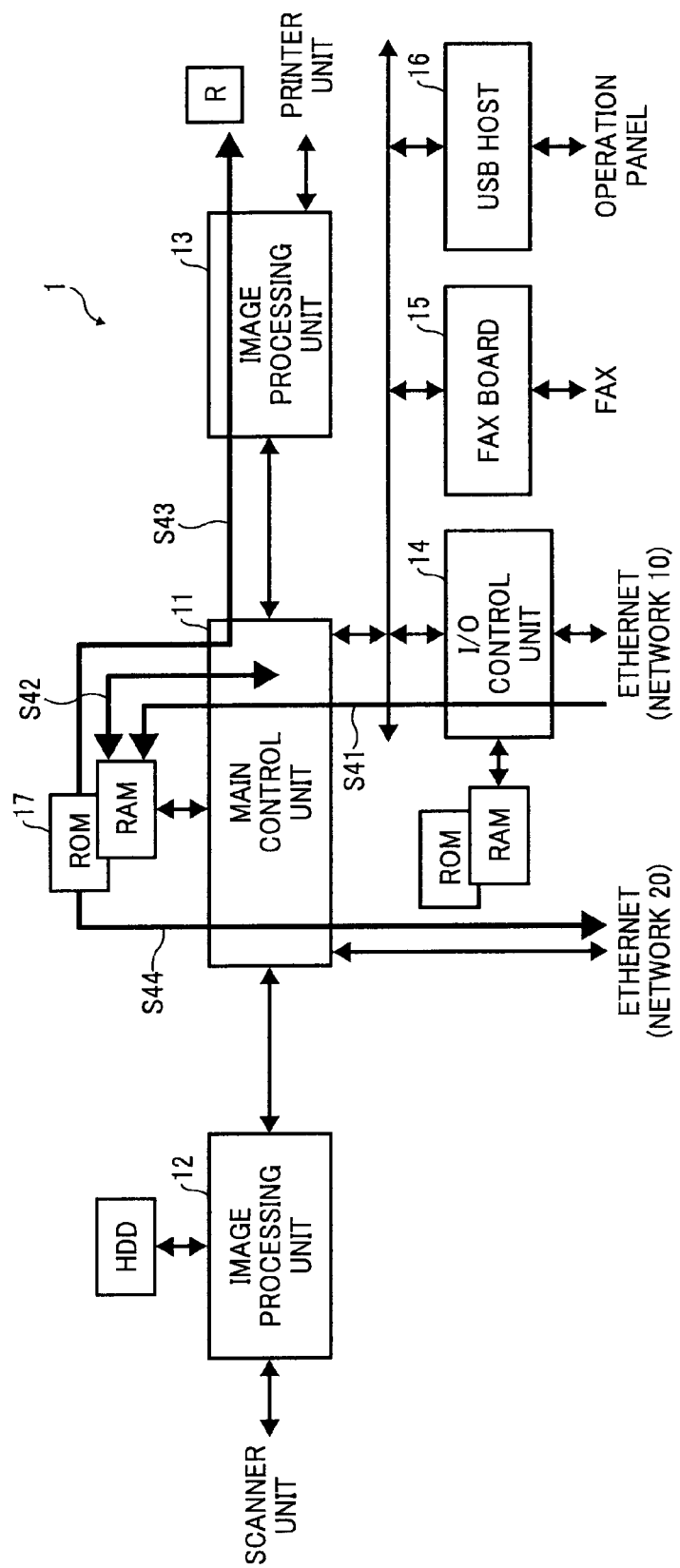
FIG. 11 is a block diagram illustrating a data flow in the upper-level image processing apparatus in the cooperative print processing.
Figure 12:
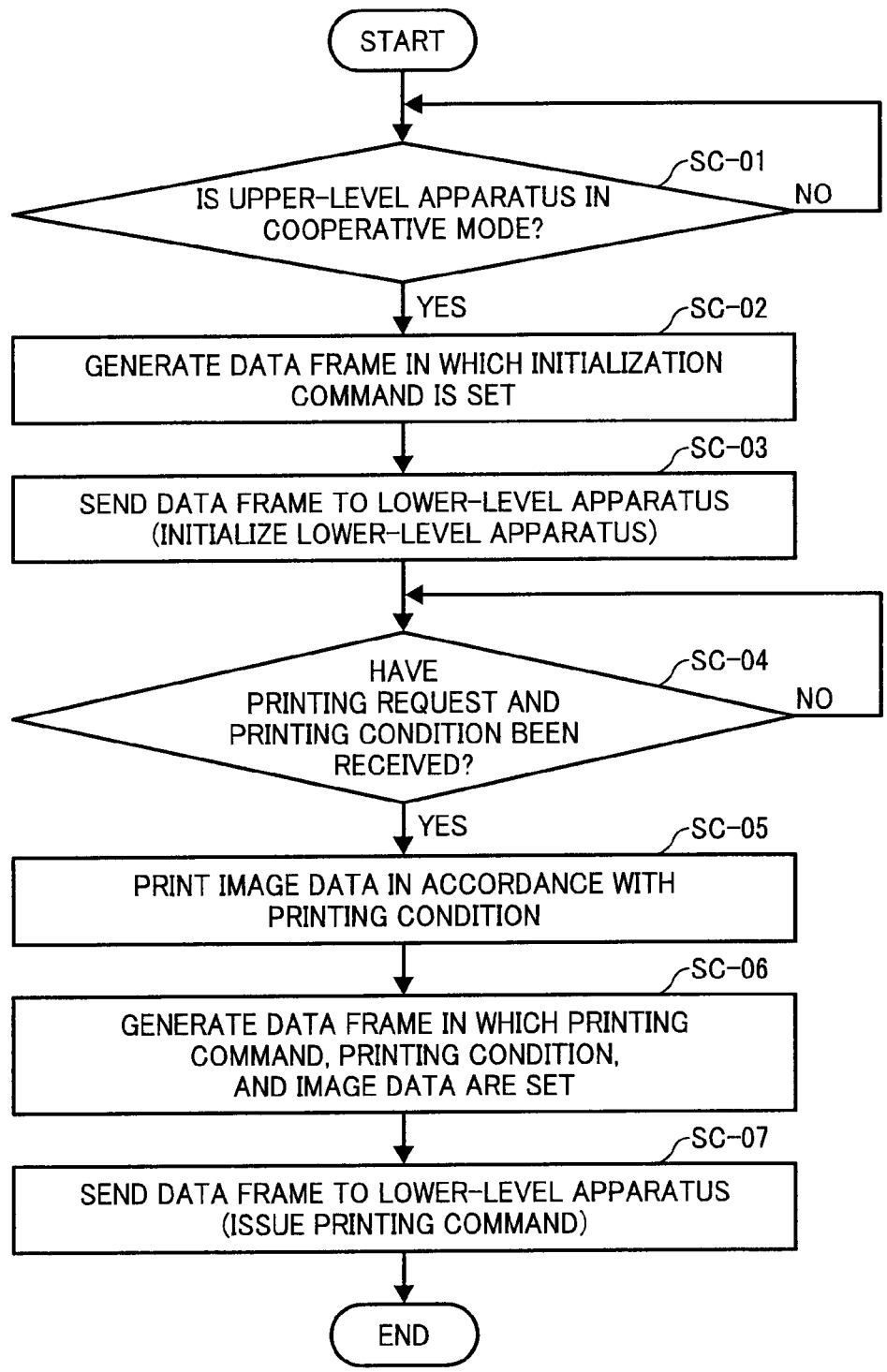
FIG. 12 is a flowchart of a process performed by the upper-level image processing apparatus during the cooperative print processing.

FIG. 11 is a block diagram illustrating a data flow in the image processing apparatus 1 in the cooperative print processing. FIG. 12 is a flowchart of a process performed by the image processing apparatus 1 during the cooperative print processing.

The main control unit 11 accesses the storage unit 17 and determines whether the image processing apparatus 1 is in the cooperative mode (Step SC-01). When the image processing apparatus 1 is in the cooperative mode (YES at Step SC-01), the image processing apparatus 1 generates a data frame in which an initialization command is set as in the case of cooperative copy processing (Step SC-02). The main control unit 11 sends the data frame to the image processing apparatus 2 via the network 20 and the image processing apparatus 2 is initialized by the initialization command set in the data frame (Step SC-03).

The main control unit 11 enters a state of waiting for a printing request including image data (print data) and a printing condition (for example, the number of print output, a sheet output size, an image quality mode such as a text mode, a photographic mode, or a text and photographic mode, and a printing mode such as a single-sided printing or a double-sided printing) that are issued by a host computer. The main control unit 11 determines whether a printing request and a printing condition have been received (Step SC-04). When a printing request and a printing condition have been received (YES at Step SC-04), the main control unit 11 causes the image processing unit 13 to process the image data in accordance with the printing condition and causes the printer unit to print the image data (Step SC-05).

Specifically, the image processing apparatus 1 receives a drawing command (printing request) from, for example, the host computer 3 via the network 10 and stores the drawing command in the storage unit 17 (Step S41). The main control unit 11 performs drawing processing on the image data and stores the processed image data in the storage unit 17 again (Step S42). The image processing unit 13 processes the image data, the processed image data is sent to the printer unit, and the printer unit prints the image data (Step S43).

Thereafter, the main control unit 11 generates a data frame in which a printing command, a printing condition, and the image data are set (Step SC-06) and sends the data frame to the image processing apparatus 2 via the network 20 (Step SC-07 and Step S44).

Figure 13:
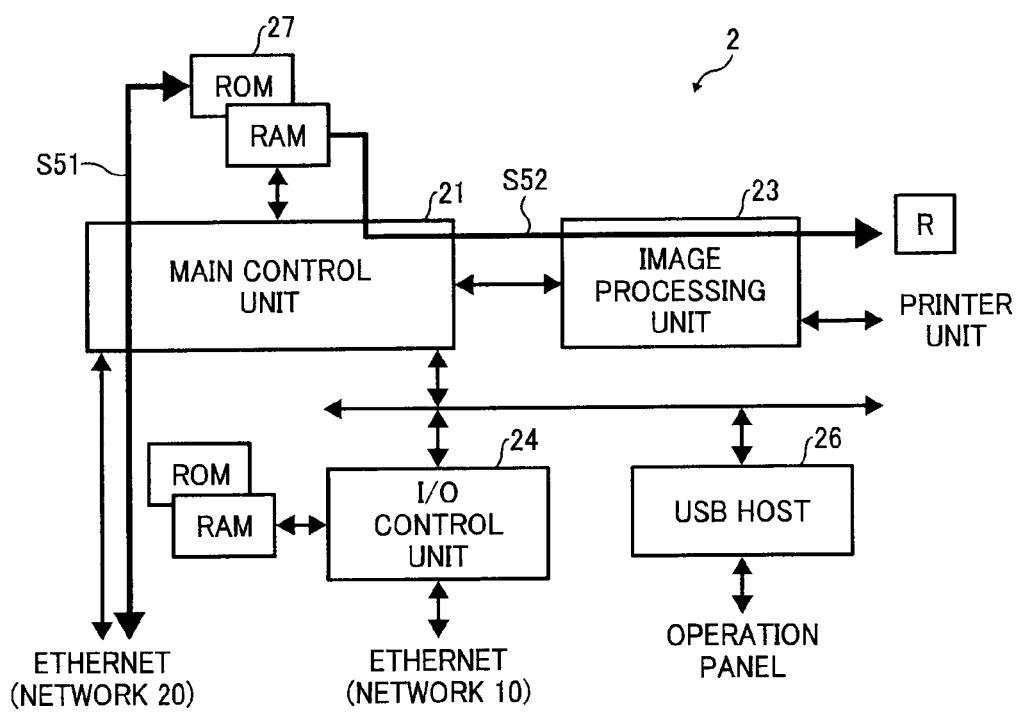
FIG. 13 is a block diagram illustrating a data flow in the lower-level image processing apparatus in the cooperative print processing.

FIG. 13 is a block diagram illustrating a data flow in the image processing apparatus 2 in the cooperative print processing.

The image processing apparatus 2 receives the data frame containing the printing command and the image data from the image processing apparatus 1 via the network 20, extracts the image data from the data frame, and temporarily stores the image data in the storage unit 27 (Step S51). The main control unit 21 reads the image data from the storage unit 27 and causes the image processing unit 23 to process the image data. The main control unit 21 sends the image data processed by the image processing unit 23 to the printer unit and causes the printer unit to print the image data (Step S52).

The cooperative print processing is performed in the image processing system 100 in a manner explained above with reference to FIGS. 10 to 13.

According to the embodiment, the cooperative copy processing and the cooperative print processing are explained as the cooperative processing. However, any type of cooperative processing can be performed as image processing. For example, cooperative scan processing can be performed in which image data scanned by an upper-level apparatus is stored in a storage unit of a lower-level apparatus. In this cooperative scan processing, the upper-level apparatus generates a data frame in which a storing command and the image data are set and sends the data frame to the lower-level apparatus.

The cooperative processing is not limited to cooperative processing between image processing apparatuses but can be performed between an image processing apparatus and a computer unit (information processing apparatus) or between an image processing apparatus and a hard disk drive (HDD).

According to the embodiment, the image processing apparatuses 1 and 2 each include the LAN interface as a dedicated interface connectable to the other image processing apparatus, and the LAN interfaces do not employ the general protocol such as the TCP/IP. Therefore, when performing the cooperative processing, high-speed data transfer with reduced overhead can be achieved without limitation on a communication distance.

Furthermore, because the image processing apparatuses 1 and 2 are connected based on such a protocol, high-speed data transfer with reduced overhead can be achieved without limitation on a communication distance.

According to an aspect of the present invention, a communication speed in cooperative processing can be increased and an interface capable of achieving longer communication distance can be used to connect a plurality of image processing apparatuses.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
  a first network interface configured to connect to a first network in which communication is performed based on a general protocol with one or more clients;
  a second network interface configured to connect to a second network in which communication is performed based on a local protocol between the image processing apparatus and an external apparatus
  a control unit configured to communicate with the external apparatus via the second network interface based on the local protocol to perform cooperative image processing in cooperation with the external apparatus;
  a scanner unit configured to scan an original and obtain image data of the original; and
  a first printer configured to print the image data, wherein
  the external apparatus includes a second printer configured to print the image data and a storage unit configured to store therein the image data,
  the local protocol defines a data structure such that a command to be executed by the external apparatus is settable in the data structure, and
  the control unit executes at least one of:
    copy processing to print the image data by using the first printer, and generates a data frame in which the command, which indicates printing of the image data by using the second printer, is set and sends the data frame to the external apparatus via the second network interface to perform cooperative copy processing that is the cooperative image processing in cooperation with the external apparatus;
    print processing to print the image data by using the first printer, and generates a data frame in which the command, which indicates printing of the image data by using the second printer, is set and sends the data frame to the external apparatus via the second network interface to perform cooperative print processing that is the cooperative image processing in cooperation with the external apparatus; and scan processing to obtain the image data by scanning the original with the scanner, and generates a data frame in which the command, which indicates storing of the image data into the storage unit, is set and sends the data frame to the external apparatus via the second network interface to perform cooperative store processing that is the cooperative image processing in cooperation with the external apparatus.

2. The image processing apparatus according to claim 1, wherein the control unit generates an initialization data frame in which an initialization command for causing the external apparatus to perform the cooperative image processing is set, and sends the initialization data frame to the external apparatus via the second network interface to start the cooperative image processing in cooperation with the external apparatus.

3. The image processing apparatus according to claim 1, further comprising:

an image processing apparatus printer unit that prints the image data, wherein the external apparatus includes an external apparatus printer unit that prints the image data, and the control unit causes the image processing apparatus printer unit to print the image data, generates a copying data frame in which a printing command for causing the external apparatus printer unit to print the image data is set, and sends the copying data frame to the external apparatus via the second network interface to perform cooperative copy processing as the cooperative image processing in cooperation with the external apparatus.

4. The image processing apparatus according to claim 1, wherein the first network interface receives the image data from outside via the first network, and the control unit generates a printing data frame in which a printing command for causing the external apparatus printer unit to print the image data is set, and sends the printing data frame to the external apparatus via the second network interface to perform cooperative print processing as the cooperative processing with the external apparatus.

5. The image processing apparatus according to claim 1, wherein the control unit generates a storing data frame in which a storing command for causing the external apparatus to store the image data in the storage unit is set, and sends the storing data frame to the external apparatus via the second network interface to perform cooperative scan processing as the cooperative image processing in cooperation with the external apparatus.

6. The image processing apparatus according to claim 1, wherein the general protocol includes TCP/IP.

7. An image processing system comprising:
a first image processing apparatus; and
a second image processing apparatus, the first image processing apparatus including:
a first network interface configured to connect to a first network in which communication is performed based on a general protocol with one or more clients;
a second network interface configured to connect to a second network in which communication is performed based on a local protocol between the first image processing apparatus and the second image processing apparatus; and
a first control unit configured to communicate with the second image processing apparatus via the second network interface to perform a cooperative image processing in cooperation with the second image processing apparatus;
a scanner unit configured to scan an original and obtain image data of the original; and
a first printer configured to print the image data,
and the second image processing apparatus including:
a third network interface configured to directly connect to the second network;
a fourth network interface configured to directly connect to the first network; and
a second control unit configured to communicate with the first image processing apparatus via the third network interface to perform the cooperative image processing in cooperation with the first image processing apparatus, wherein
the second image processing apparatus includes a second printer configured to print the image data and a storage unit configured to store therein the image data,
the local protocol defines a data structure such that a command to be executed by the second image processing apparatus is settable in the data structure, and
the first control unit executes at least one of:
copy processing to print the image data by using the first printer, and generates a data frame in which the command, which indicates printing of the image data by using the second printer, is set and sends the data frame to the second image processing apparatus via the second network interface to perform cooperative copy processing that is the cooperative image processing in cooperation with the second image processing apparatus;
print processing to print the image data by using the first printer, and generates a data frame in which the command, which indicates printing of the image data by using the second printer, is set and sends the data frame to the second image processing apparatus via the second network interface to perform cooperative print processing that is the cooperative image processing in cooperation with the second image processing apparatus; and
scan processing to obtain the image data by scanning the original with the scanner, and generates a data frame in which the command, which indicates storing of the image data into the storage unit, is set and sends the data frame to the second image processing apparatus via the second network interface to perform cooperative store processing that is the cooperative image processing in cooperation with the second image processing apparatus.

8. The image processing system according to claim 7, wherein the first control unit, based on said data structure, generates the data frame in which the command is set, sends the data frame to the second image processing apparatus via the second network interface to perform the cooperative image processing in cooperation with the second image processing apparatus, the third network interface receives the data frame from the first image processing apparatus based on the local protocol, and the second control unit analyzes the data frame, extracts the command from the data frame, and processes image data in accordance with the command to perform the cooperative image processing in cooperation with the first image processing apparatus.

9. An image processing method performed by an image processing system including a first image processing apparatus and a second image processing apparatus, the first image processing apparatus including:

a first network interface connected to a first network in which communication is performed based on a general protocol with one or more clients;

a scanner unit configured to scan an original and obtain image data of the original;

a first printer configured to print the image data, wherein the second image processing apparatus includes a second printer configured to print the image data and a storage unit configured to store therein the image data, the local protocol defines a data structure such that a command to be executed by the second image processing apparatus is settable in the data structure, and a second network interface connected to a second network in which communication is performed based on a local protocol between the first image forming apparatus and the second image processing apparatus, and the second image processing apparatus including:

a third network interface directly connected to the second network; and a fourth network interface directly connected to the first network, the image processing method comprising:

causing the first image processing apparatus to communicate with the second image processing apparatus based on the local protocol to perform cooperative image processing in cooperation with the second image processing apparatus;

causing the second image processing apparatus to communicate with the first image processing apparatus via the third network interface to perform the cooperative image processing in cooperation with the first image processing apparatus; and causing a control unit of the first image processing apparatus to execute at least one of:

copy processing to print the image data by using the first printer, and generates a data frame in which the command, which indicates printing of the image data by using the second printer, is set and sends the data frame to the second image processing apparatus via the second network interface to perform cooperative copy processing that is the cooperative image processing in cooperation with the second image processing apparatus;

print processing to print the image data by using the first printer, and generates a data frame in which the command, which indicates printing of the image data by using the second printer, is set and sends the data frame to the second image processing apparatus via the second network interface to perform cooperative print processing that is the cooperative image processing in cooperation with the second image processing apparatus; and scan processing to obtain the image data by scanning the original with the scanner, and generates a data frame in which the command, which indicates storing of the image data into the storage unit, is set and sends the data frame to the second image processing apparatus via the second network interface to perform cooperative store processing that is the cooperative image processing in cooperation with the second image processing apparatus.

* * * * *